(12) United States Patent
Korlimarla et al.

(10) Patent No.: US 12,073,432 B2
(45) Date of Patent: Aug. 27, 2024

(54) SYSTEMS AND METHODS FOR CONTEXTUAL TARGETING OPTIMIZATION

(71) Applicant: Walmart Apollo, LLC, Bentonville, AR (US)

(72) Inventors: Jayanth Korlimarla, Sunnyvale, CA (US); Xunfan Cai, Santa Clara, CA (US); Manyu Zhou, Sunnyvale, CA (US); Peng Yang, San Jose, CA (US); Zheng Guo, San Jose, CA (US); Yuxia Qiu, Palo Alto, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 38 days.

(21) Appl. No.: 17/589,439

(22) Filed: Jan. 31, 2022

(65) Prior Publication Data

US 2023/0245169 A1   Aug. 3, 2023

(51) Int. Cl.
  *G06Q 30/0251* (2023.01)
(52) U.S. Cl.
  CPC .............................. *G06Q 30/0253* (2013.01)
(58) Field of Classification Search
  CPC .................................................. G06Q 30/0253
  See application file for complete search history.

(56) References Cited

U.S. PATENT DOCUMENTS

| | | | |
|---|---|---|---|
| 11,250,042 B2 * | 2/2022 | Chang | G06F 16/313 |
| 11,777,970 B1 * | 10/2023 | Wainer | G06F 16/24578 726/23 |
| 2013/0132212 A1 | 5/2013 | Ruarte et al. | |
| 2013/0144871 A1 * | 6/2013 | Xia | G06F 16/78 707/723 |
| 2014/0278959 A1 * | 9/2014 | Nukala | G06Q 30/0277 705/14.49 |
| 2015/0088896 A1 | 3/2015 | Gehrking et al. | |
| 2016/0260123 A1 * | 9/2016 | Mishra | G06Q 30/0244 |
| 2019/0378169 A1 | 12/2019 | Agarwal et al. | |
| 2020/0160388 A1 | 5/2020 | Sabeg et al. | |
| 2021/0012405 A1 * | 1/2021 | Wadhwa | G06Q 30/0631 |
| 2021/0065247 A1 | 3/2021 | Haldar et al. | |
| 2021/0118007 A1 | 4/2021 | Heiser, II et al. | |

FOREIGN PATENT DOCUMENTS

| | | | | |
|---|---|---|---|---|
| CN | 111291165 A | * | 6/2020 | ......... G06F 16/3344 |
| CN | 112086133 A | * | 12/2020 | |
| CN | 112308210 A | * | 2/2021 | ............. G06F 8/436 |

* cited by examiner

*Primary Examiner* — Mario C. Iosif
(74) *Attorney, Agent, or Firm* — BRYAN CAVE LEIGHTON PAISNER LLP

(57) ABSTRACT

A system including one or more processors and one or more non-transitory computer readable media storing computing instructions that, when executed on the one or more processors, perform: receiving a taxonomy identifier corresponding to a taxonomy for a product; determining taxonomy embeddings based on the taxonomy identifier, the taxonomy embeddings representing at least a first level of the taxonomy and a second level of the taxonomy; modifying taxonomies based on a threshold to reduce a number of the taxonomy embeddings in subsequent processing; and mapping the taxonomies, as modified, to publisher placements to display the product within the taxonomies on a graphical user interface (GUI).

18 Claims, 5 Drawing Sheets

SYSTEMS AND METHODS FOR CONTEXTUAL TARGETING OPTIMIZATION

TECHNICAL FIELD

This disclosure relates generally to media campaigns, and more particularly to systems and methods for contextual targeting optimization.

BACKGROUND

Typically, a company will prepare a media campaign to advertise a product. For example, the company may desire to prepare a media campaign for soda.

Accordingly, the company will attempt to identify a target demographic to advertise to. Targeting a specific demographic can be useful. However, if the media campaign is presented outside of the media campaign context, it is unlikely that the media campaign will be successful. For example, if the media campaign is for soda and the media campaign is being presented to the target demographic outside of the soda context (e.g., baby supplies), a user who is exposed to the media campaign is unlikely to be influenced to purchase the soda. This puts a burden on companies that wish to run media campaigns. For example, the companies can exhaust resources on media campaigns that may not be contributing to purchases, thereby wasting time, money, and resources.

BRIEF DESCRIPTION OF THE DRAWINGS

To facilitate further description of the embodiments, the following drawings are provided in which.

Figure 1:
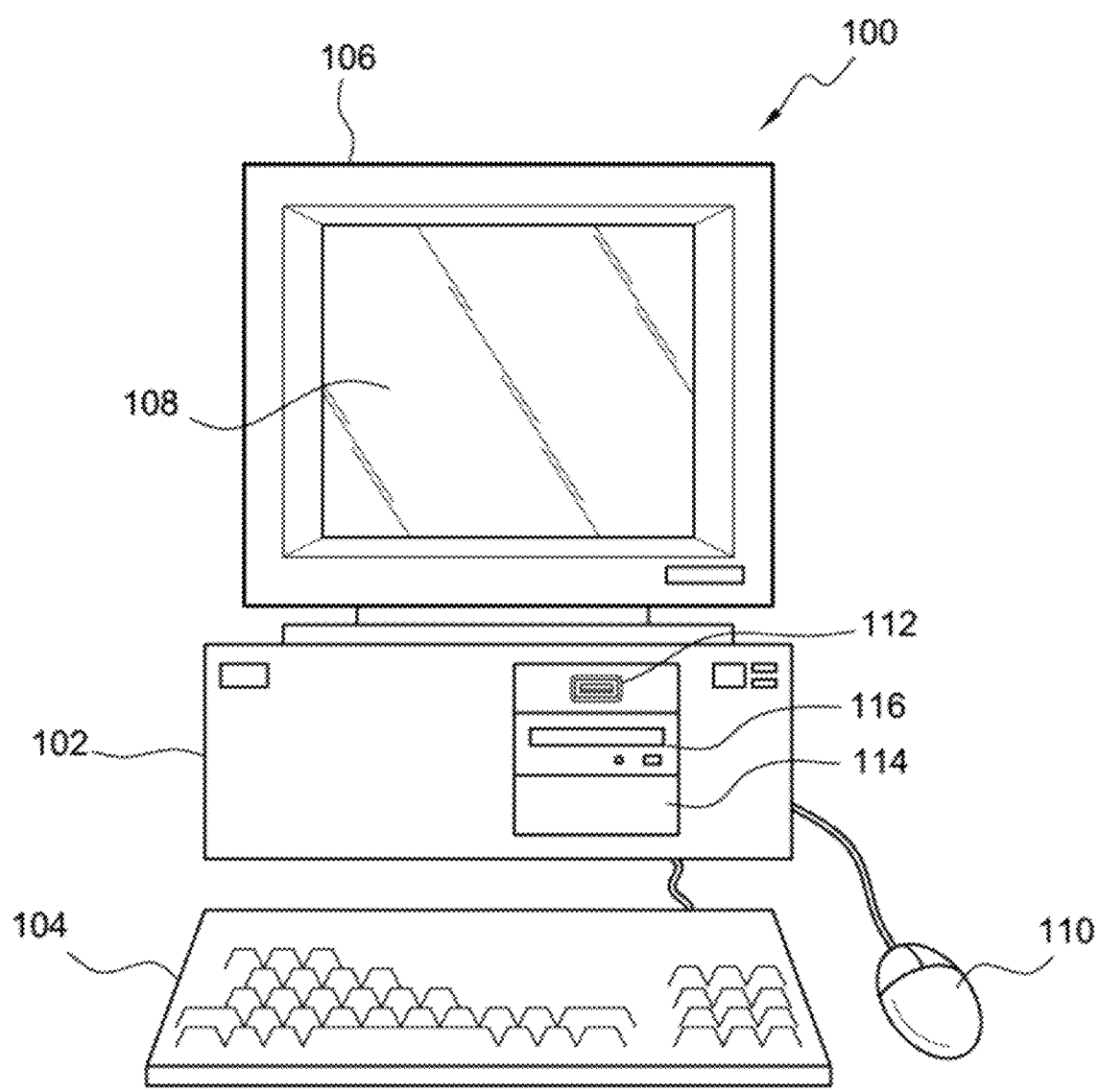
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving a taxonomy identifier corresponding to a taxonomy for a product; determining taxonomy embeddings based on the taxonomy identifier, the taxonomy embeddings representing at least a first level of the taxonomy and a second level of the taxonomy; modifying taxonomies based on a threshold to reduce a number of the taxonomy embeddings in subsequent processing; and mapping the taxonomies, as modified, to publisher placements to display the product within the taxonomies on a graphical user interface (GUI).

Various embodiments include a method. The method can be implemented via execution of computing instructions configured to run at one or more processors and configured to be stored at non-transitory computer-readable media. The method can comprise receiving a taxonomy identifier corresponding to a taxonomy for a product; determining taxonomy embeddings based on the taxonomy identifier, the taxonomy embeddings representing at least a first level of the taxonomy and a second level of the taxonomy; modifying taxonomies based on a threshold to reduce a number of the taxonomy embeddings in subsequent processing; and mapping the taxonomies, as modified, to publisher placements to display the product within the taxonomies on a graphical user interface (GUI).

Figure 2:
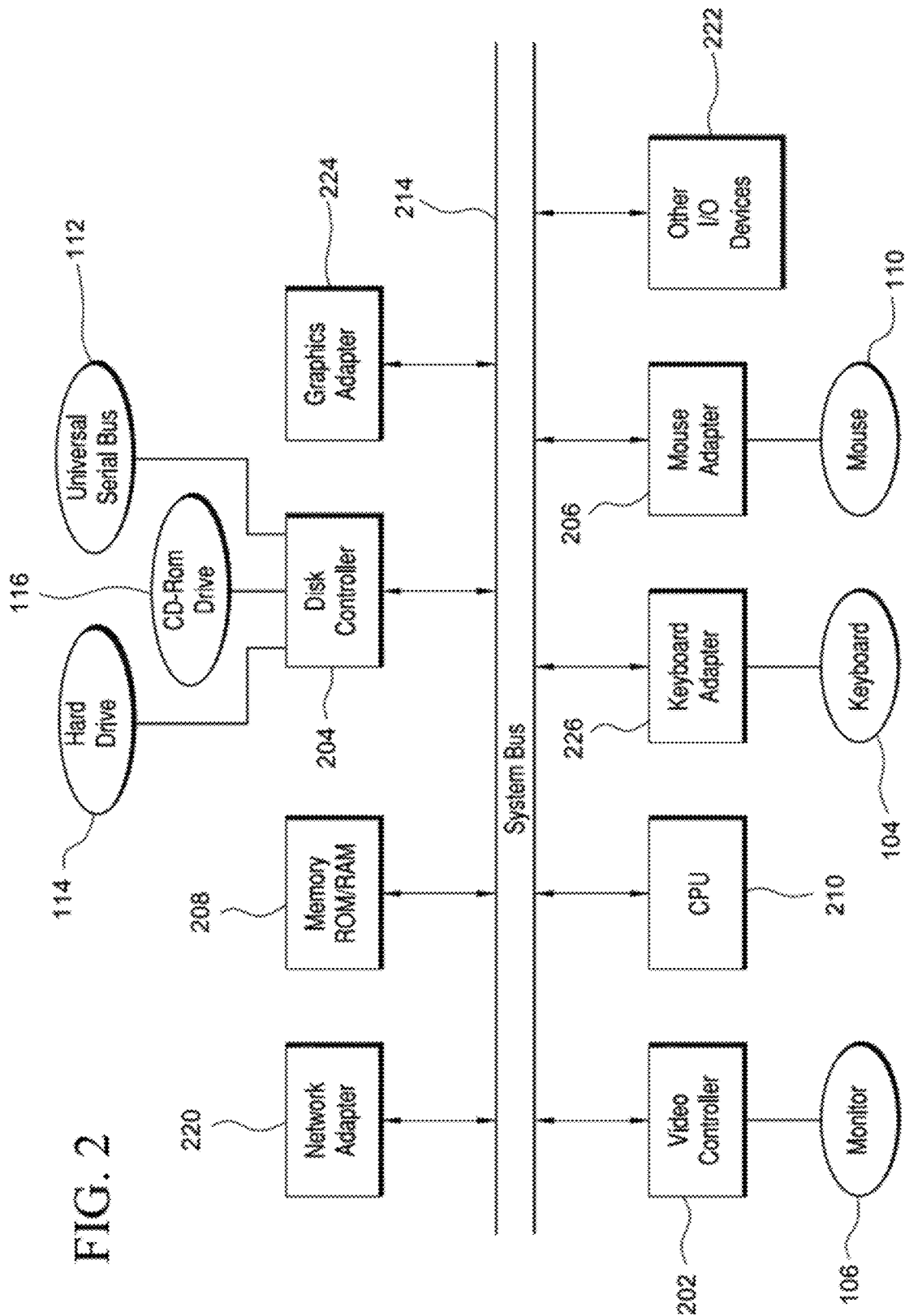
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
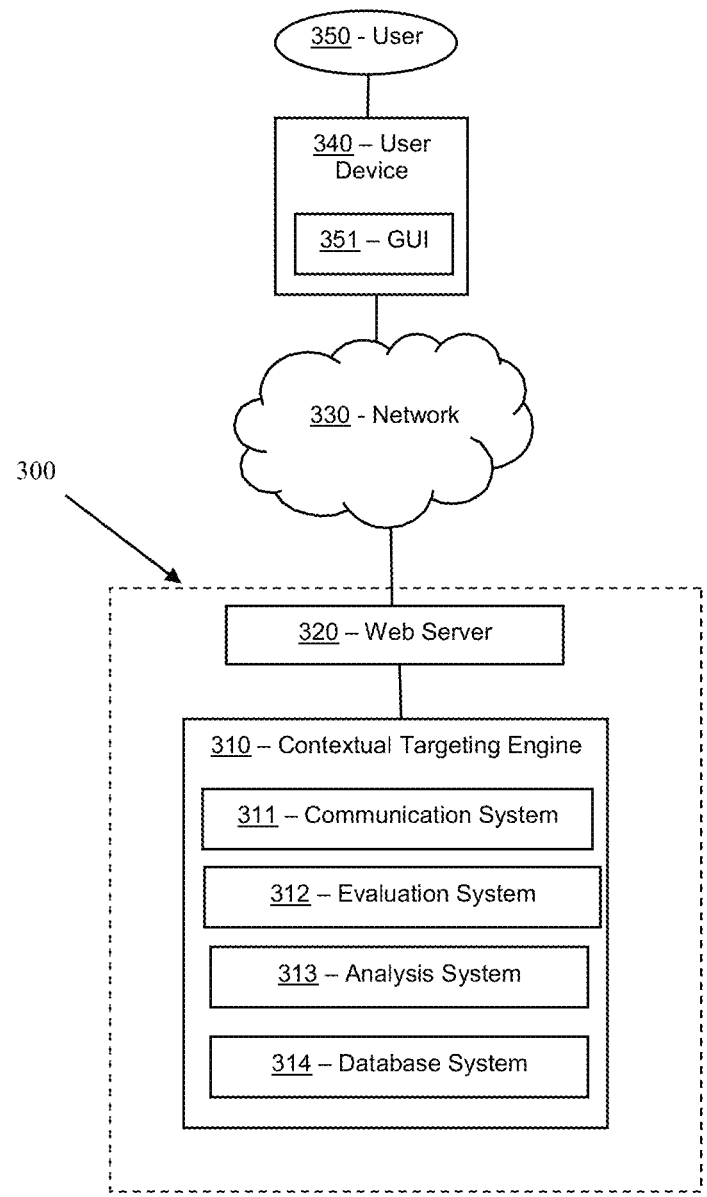
FIG. 3 illustrates a representative block diagram of a system for performing contextual targeting optimization, according to an embodiment.

Turning ahead in the drawings, FIG. 3 illustrates a block diagram of a system 300 that can be employed for performing contextual targeting optimization, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a contextual targeting engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Contextual targeting engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host contextual targeting engine 310 and/or web server 320. Additional details regarding contextual targeting engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. In certain embodiments, user device 340 can be desktop computers, laptop computers, smart phones, tablet devices, and/or other endpoint devices. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to browse a website or performing contextual targeting optimization, in addition to other suitable activities. In a number of embodiments, web server 320 can interface with contextual targeting engine 310 when a user (e.g., 350) is browsing a website, or performing contextual targeting optimization.

In some embodiments, an internal network that is not open to the public can be used for communications between contextual targeting engine 310 and web server 320 within system 300. Accordingly, in some embodiments, contextual targeting engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, contextual targeting engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to contextual targeting engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of contextual targeting engine 310 and/or web server 320. In a similar manner, the processors and/or the non-transitory computer-readable media can be local and/or remote to each other.

Meanwhile, in many embodiments, contextual targeting engine 310 and/or web server 320 also can be configured to communicate with one or more databases, such as a database system 314. The one or more databases can include media campaign information, user activity information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, contextual targeting engine 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, contextual targeting engine 310 can include a communication system 311, an evaluation system 312, an analysis system 313, and/or database system 314. In many embodiments, the systems of contextual targeting engine 310 can be modules of computing instructions (e.g., software modules) stored at non-transitory computer readable media that operate on one or more processors. In other embodiments, the systems of contextual targeting engine 310 can be implemented in hardware. Contextual targeting engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host contextual targeting engine 310 and/or web server 320. Additional details regarding contextual targeting engine 310 and the components thereof are described herein.

In many embodiments, user device 340 can comprise graphical user interface ("GUI") 351. In the same or different embodiments, GUI 351 can be part of and/or displayed by user device 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user device 340. In the same or different embodiments, GUI 351 can comprise a website accessed through network 330. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

Figure 4:
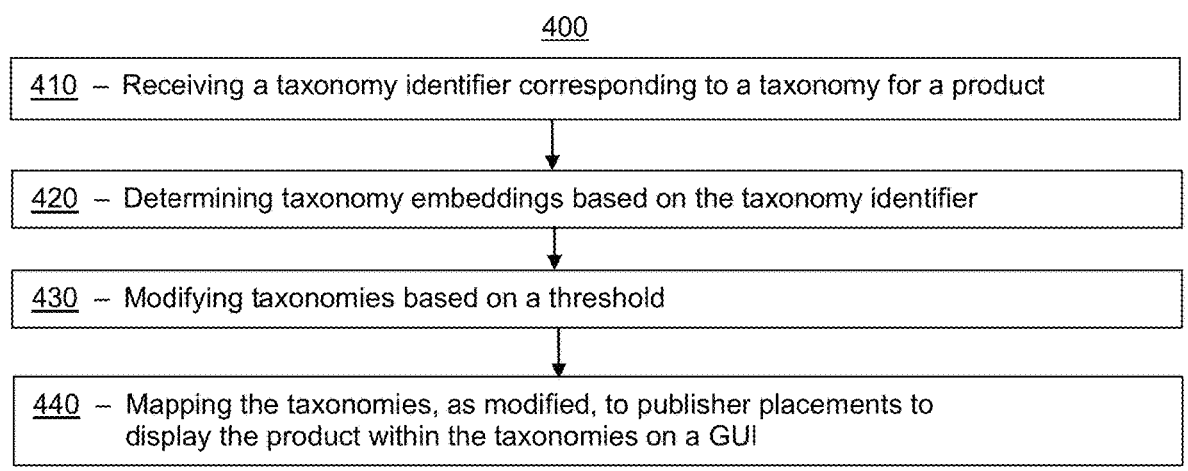
FIG. 4 illustrates a flowchart for a method of performing contextual targeting optimization, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as contextual targeting engine 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving a taxonomy identifier corresponding to a taxonomy for a product. In some embodiments, activity 410 comprises receiving user session activity corresponding to a user of the GUI. For example, during operation, a particular campaign is identified (e.g., advertisements for Pepsi) and the campaign taxonomy identifier is determined. The taxonomy identifier corresponds to a taxonomy the campaign product is associated with. In this example, the taxonomy identifier can be "canned beverages." As discussed in more detail below, activities 410-440 can analyze one or more taxonomies to determine which of the taxonomies will provide the advertising campaign with the most reach. Here, a campaign corresponds to an advertising campaign for a product (e.g., soda), and a taxonomy corresponds to a hierarchical structure of products and product categories. For example, a taxonomy can include a first level (L1) for Groceries, a second level (L2) for Fresh Vegetables, and a third level (L3) that includes all the products within L2 (e.g., asparagus, broccoli, etc.). Accordingly, embodiments disclosed herein can identify a taxonomy that will provide an advertising campaign with the most reach. For example, when a taxonomy is determined (e.g., L2 of fresh vegetables) the advertising campaign can display its advertisement to a user who is browsing products within the determined taxonomy (e.g., L2 fresh vegetables).

In many embodiments, method 400 can comprise an activity 420 of determining taxonomy embeddings based on the taxonomy identifier. In some embodiments, the taxonomy embeddings representing at least a first level of the taxonomy and a second level of the taxonomy. In some embodiments, taxonomy embeddings can be computed for additional levels of the taxonomy. In some embodiments, determining the taxonomy embeddings based on the taxonomy identifier comprises determining a respective similarity score for the taxonomy embeddings. In some embodiments, determining the taxonomy embeddings comprises embedding, using a machine learning model, as trained, the first level of the taxonomy into a first vector. In some embodiments, the machine learning model is part of the contextual targeting engine 310 (e.g., stored within the evaluation system 312). In some embodiments, the machine learning model comprises a Word2Vec skip-gram neural network. In other embodiments, the machine learning model comprises a Node2Vec neural network. In some embodiments, the machine learning model is trained on one or more taxonomy data sets. In some embodiments, training the machine learning model can comprise estimating internal parameters of a model configured to identify taxonomies based on a taxonomy identifier. In various embodiments, the machine learning model can be trained using labeled training data, otherwise known as a training dataset. In many embodiments, a training dataset can comprise all or a part of information described, created, and/or annotated in activities 410-440. In this way, the machine learning model can be configured to determine taxonomy embeddings. In some embodiments, determining the taxonomy embeddings comprises inputting one or more sequences of the user session activity into the machine learning model. In some embodiments, the user session activity comprises page views.

Figure 5:
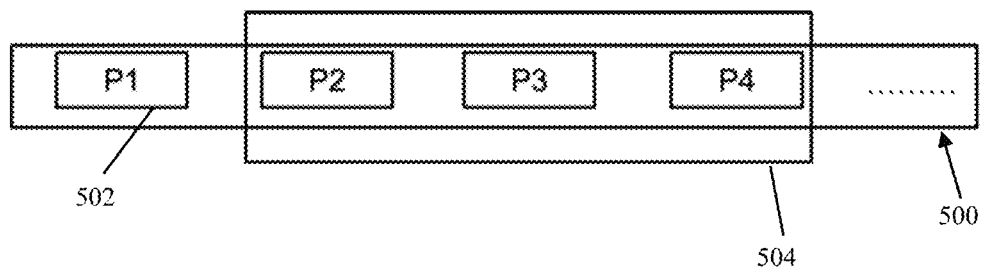
FIG. 5 illustrates an exemplary taxonomy embedding relationship, according to certain embodiments.
Figure 5:
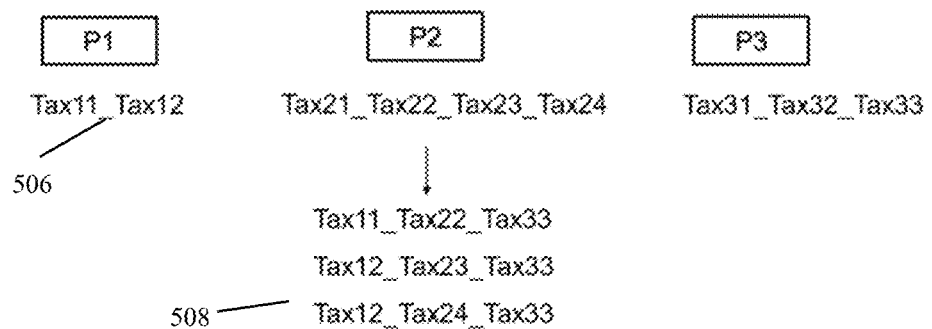

Turning ahead in the drawings, FIG. 5 illustrates an exemplary taxonomy embedding relationship, which can be utilized by the machine learning model. In the illustrated embodiment, a user view session 500 comprises page views 502 and a window 504. In some embodiments, the page views 502 comprise a taxonomy path. In some embodiments, to determine a taxonomy embedding, activity 420 (FIG. 4) determines a size C for the window 504 to determine a center word or pattern so the machine learning model can determine words/patterns around the center. In the illustrated embodiment, P3 is the center page view 502. In some embodiments, determining a taxonomy embedding comprised maximizing an average log-likelihood using an equation comprising:

$$\frac{1}{T}\sum_{t=1}^{T}\sum_{j=-k}^{j=k} \log(p(w_{t+j} | w_t)), k = \text{training window size}$$

where k comprises a training size window, T comprises a dictionary size, $w_i$ comprises word in the dictionary, u, comprises context word vector, and $v_w$ comprises center word vector.

In some embodiments, within the above equation, the definition of probability P(w|w) is maximum likelihood:

$$p(w_i | w_j) = \frac{\exp(u_{w_i}^T v_{w_j})}{\sum_{l=1}^{V} \exp(u_l^T v_{w_j})}$$

In some embodiments, determining the taxonomy embedding comprises, performing a random walk. In some embodiments, performing a random walk comprises modifying taxonomy identifier 506 of page views 502 to determine taxonomy embeddings 508.

Returning to activity 420 of FIG. 4, in some embodiments, determining the taxonomy embeddings comprises embedding, using the machine learning model, as trained, each respective word in the second level of the taxonomy into one or more second vectors. In some embodiments, activity 420 comprises determining the respective similarity score between the first vector and each respective second vector of the one or more second vectors. In some embodiments, determining the respective similarity score further comprises using a cosine similarity measurement. For example, an embedding corresponds to a group of vectors (e.g., an L3 taxonomy corresponding to products including their associated taxonomy) linked to a central node (e.g., an L2 taxonomy). The similarity scores can be determined by identifying embeddings that are within a threshold similarity of the taxonomy identifier for the campaign, such as which embeddings are within a threshold similarity of "canned beverages" based on the user session activity.

In many embodiments, method 400 can comprise an activity 430 of modifying taxonomies based on a threshold. In some embodiments, activity 430 modifies the taxonomies based on the threshold to reduce a number of the taxonomy embeddings in subsequent processing. In some embodiments, modifying the taxonomies based on the threshold to reduce the number of the taxonomy embeddings in the subsequent processing comprises removing taxonomies that are below the threshold. In some embodiments, the threshold is a number of aggregate page views. For example, any taxonomy embedding that has an aggregate page view below 25 page views is removed. However, any number of page views can be utilized in the threshold based on parameters of the optimization. In some embodiments, the page views threshold can be used to remove taxonomies from training the machine learning model for determining taxonomy embeddings. In some embodiments, the threshold is a similarity score corresponding to a taxonomy of the taxonomy taxonomies. For example, if input taxonomy is T1 and the complete list of taxonomies in the system are T2, T3, T4, T5. For a given threshold e.g. 0.8, activity 440 can compute similarity scores for T2, T3, T4, T5 with T1 and the similarity scores can be 0.9, 0.7, 0.75, 0.85 respectively. In such an example, the taxonomies would be modified to remove T3 and T4 and keep T2 and T5 since their threshold is >0.8.

In many embodiments, method 400 can comprise an activity 440 of mapping the taxonomies, as modified, to publisher placements to display the product within the taxonomies on a graphical user interface (GUI). In some embodiments, mapping the taxonomies, as modified, to the publisher placements comprises mapping the product to DoubleClick for Publishers (DFP) placements within the taxonomies, as modified. For example, the taxonomy identifier for the campaign is mapped to DFP placements within the identified filtered taxonomies. Once mapped to the DFP placements, the taxonomy for the campaign (e.g., advertisements for the product) are displayed on a GUI within the identified filtered taxonomies.

In one embodiment, activity 410 receives the taxonomy identifier corresponding to the taxonomy for a product. In such an embodiment, the taxonomy embeddings are not modified (as detailed in activity 430). Instead, similarity scores are determined for all taxonomies based on cosine similarity of taxonomy embeddings corresponding to the input taxonomy identifier with all other taxonomy embeddings. The taxonomies are filtered based on a threshold similarity score, and the taxonomies with a threshold similarity score are utilized in subsequent processing. For example, the following taxonomies may be determined to have a number of page views: T1, T2, T3, T4, T5, T6. During machine learning model training, T6 may be excluded because it does not satisfy a page view threshold, and taxonomy embeddings may be determined for the remaining taxonomies. After training, an input taxonomy identifier and a similarity score threshold (e.g., 0.8, 0.3, etc.) may be received. Similarity scores are determined for T2, T3, T4, T5 based on T1 and which can result in similarity scores of 0.9, 0.7, 0.75, 0.85 respectively. Based on the similarity scores, T2 and T5 are determined to satisfy the similarity score threshold, and will be utilized in subsequent processing.

Returning to FIG. 3, in several embodiments, communication system 311 can at least partially perform activity 410 (FIG. 4).

In several embodiments, evaluation system 312 can at least partially perform activity 420 (FIG. 4) and/or activity 430 (FIG. 4).

In a number of embodiments, analysis system 313 can at least partially perform activity 440 (FIG. 4).

In a number of embodiments, web server 320 can at least partially perform method 400 (FIG. 4).

In many embodiments, the techniques described herein can provide a practical application and several technological improvements. In some embodiments, the techniques described herein can provide reduce a burden on a processing system by removing taxonomies from subsequent processing. For example, it would be too computationally intensive to analyze each of the taxonomies and their associated information.

In many embodiments, the techniques described herein can be used continuously at a scale that cannot be reasonably performed using manual techniques or the human mind. For example, processing millions of taxonomies within milliseconds cannot be feasibly completed by a human.

In a number of embodiments, the techniques described herein can solve a technical problem that arises only within the realm of computer networks, as online campaign impressions and taxonomies do not exist outside the realm of computer networks.

In many embodiments, the techniques described herein can solve a technical problem in a related field that cannot be solved outside the context of computer networks. Specifically, the techniques described herein cannot be used outside the context of computer networks due to a lack of data and because the contextual targeting engine cannot be operated without a computer system and/or network.

Although systems and methods for contextual targeting optimization have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, perform:
   receiving a taxonomy identifier corresponding to a taxonomy for a product;
   determining one or more taxonomy embeddings based on the taxonomy identifier by:
      collecting one or more taxonomy identifiers corresponding to one or more taxonomies for one or more products;
      applying one or more respective filtering thresholds to each of the one or more taxonomy identifiers to create a modified set of the one or more taxonomy identifiers;
      creating a training data set comprising the modified set of the one or more taxonomy identifiers; and
      training a machine learning model in a first stage using the training data set to estimate internal parameters of the machine learning model to determine the one or more taxonomy embeddings, the one or more taxonomy embeddings representing at least a first level of the taxonomy and a second level of the taxonomy, the machine learning model to determine the one or more taxonomy embeddings based on training features to enable the machine learning model to determine words or patterns around a center word, the training features including a window size, a dictionary size, a context word vector, a center word vector, and a probability, the probability corresponding to a function between the context word vector and the center word vector;
   reducing a number of the taxonomy embeddings in subsequent processing by the machine learning model by removing taxonomies that are below a threshold, wherein the threshold is a number of aggregate page views; and mapping the one or more taxonomies, as reduced, to publisher placements to display the product within the one or more taxonomies, as reduced, on a graphical user interface (GUI).

2. The system of claim 1, wherein the computing instructions, when executed on the one or more processors, further perform receiving user session activity corresponding to a user of the GUI.

3. The system of claim 2, wherein determining the one or more taxonomy embeddings based on the taxonomy identifier further comprises determining a respective similarity score for the one or more taxonomies.

4. The system of claim 3, wherein determining the one or more taxonomy embeddings further comprises:
   embedding, using the machine learning model, as trained, the first level of the taxonomy into a first vector;
   embedding, using the machine learning model, as trained, each respective word in the second level of the taxonomy into one or more second vectors; and
   determining the respective similarity score between the first vector and each respective second vector of the one or more second vectors.

5. The system of claim 4, wherein the machine learning model comprises a Word2Vec skip-gram neural network.

6. The system of claim 4, wherein determining the respective similarity score further comprises using a cosine similarity measurement.

7. The system of claim 4, wherein determining the one or more taxonomy embeddings comprises inputting one or more sequences of the user session activity into the machine learning model.

8. The system of claim 1, wherein the threshold is a similarity score.

9. The system of claim 1, wherein the publisher placements comprise DoubleClick for Publishers (DFP) placements.

10. A method implemented via execution of computing instructions configured to run at one or more processors and configured to be stored at non-transitory computer-readable media, the method comprising:
    receiving a taxonomy identifier corresponding to a taxonomy for a product;
    determining one or more taxonomy embeddings based on the taxonomy identifier by:
       collecting one or more taxonomy identifiers corresponding to one or more taxonomies for one or more products;
       applying one or more respective filtering thresholds to each of the one or more taxonomy identifiers to create a modified set of the one or more taxonomy identifiers;
       creating a training data set comprising the modified set of the one or more taxonomy identifiers; and
       training a machine learning model in a first stage using the training data set to estimate internal parameters of the machine learning model to determine the one or more taxonomy embeddings, the one or more taxonomy embeddings representing at least a first level of the taxonomy and a second level of the taxonomy, the machine learning model to determine the one or more taxonomy embeddings based on training features to enable the machine learning model to determine words or patterns around a center word, the training features including a window size, a dictionary size, a context word vector, a center word vector, and a probability, the probability corresponding to a function between the context word vector and the center word vector;
    reducing a number of the taxonomy embeddings in subsequent processing by the machine learning model by removing taxonomies that are below a threshold, wherein the threshold is a number of aggregate page views; and
    mapping the one or more taxonomies, as reduced, to publisher placements to display the product within the one or more taxonomies, as reduced, on a graphical user interface (GUI).

11. The method of claim 10, further comprising receiving user session activity corresponding to a user of the GUI.

12. The method of claim 11, wherein determining the one or more taxonomy embeddings based on the taxonomy identifier further comprises determining a respective similarity score for the one or more taxonomies.

13. The method of claim 12, wherein determining the one or more taxonomy embeddings further comprises:
    embedding, using the machine learning model, as trained, the first level of the taxonomy into a first vector;
    embedding, using the machine learning model, as trained, each respective word in the second level of the taxonomy into one or more second vectors; and
    determining the respective similarity score between the first vector and each respective second vector of the one or more second vectors.

14. The method of claim 13, wherein the machine learning model comprises a Word2Vec skip-gram neural network.

15. The method of claim 13, wherein determining the respective similarity score further comprises using a cosine similarity measurement.

16. The method of claim 13, wherein determining the one or more taxonomy embeddings comprises inputting one or more sequences of the user session activity into the machine learning model.

17. The method of claim 10, wherein the threshold is a similarity score.

18. The method of claim 10, wherein the publisher placements comprise DoubleClick for Publishers (DFP) placements.

* * * * *